United States Patent [19]
Parry

[11] Patent Number: 6,059,087
[45] Date of Patent: May 9, 2000

[54] TORQUE LIMITING CLUTCH

[75] Inventor: Stephen John Parry, Longlevens, United Kingdom

[73] Assignee: British Autogard Limited of Barton Lane, Gloucestershire, United Kingdom

[21] Appl. No.: 09/126,409

[22] Filed: Jul. 30, 1998

[30] Foreign Application Priority Data

Aug. 1, 1997 [GB] United Kingdom .................. 9716166

[51] Int. Cl.$^7$ ..................................................... F16D 11/04
[52] U.S. Cl. ........................................ 192/56.54; 192/150
[58] Field of Search ................................. 192/55.1, 56.1, 192/56.5, 56.57, 56.62, 150, 56.54, 56.51

[56] References Cited

U.S. PATENT DOCUMENTS

| | | |
|---|---|---|
| 2,859,846 | 11/1958 | Shappell. |
| 3,199,644 | 8/1965 | Clapp ..................................... 192/56.53 |
| 3,937,036 | 2/1976 | Sauerwein. |
| 3,985,213 | 10/1976 | Braggins. |
| 4,142,616 | 3/1979 | Dekoninck ........................... 192/56.54 |
| 4,284,374 | 8/1981 | Senzaki ........................... 192/56.51 X |
| 5,092,441 | 3/1992 | Fujii .................................... 192/56.54 |
| 5,101,947 | 4/1992 | Braun et al. ......................... 192/56.53 |
| 5,314,381 | 5/1994 | Maurer. |

FOREIGN PATENT DOCUMENTS

| | | |
|---|---|---|
| B-0156993 | 12/1984 | European Pat. Off. . |
| 554046 | 7/1932 | Germany. |
| 1238936 | 7/1971 | United Kingdom. |
| 1483331 | 8/1977 | United Kingdom. |
| 2018368 | 10/1979 | United Kingdom. |
| 2099348 | 12/1982 | United Kingdom. |

*Primary Examiner*—Charles A Marmor
*Assistant Examiner*—Saúl Rodríguez
*Attorney, Agent, or Firm*—Marshall, O'Toole, Gerstein, Murray & Borun

[57] ABSTRACT

A torque limiting clutch of the kind specified provided with at least one expedient, independent of said connection means, for movement of the torque transmitting member between said operative and inoperative positions.

26 Claims, 3 Drawing Sheets

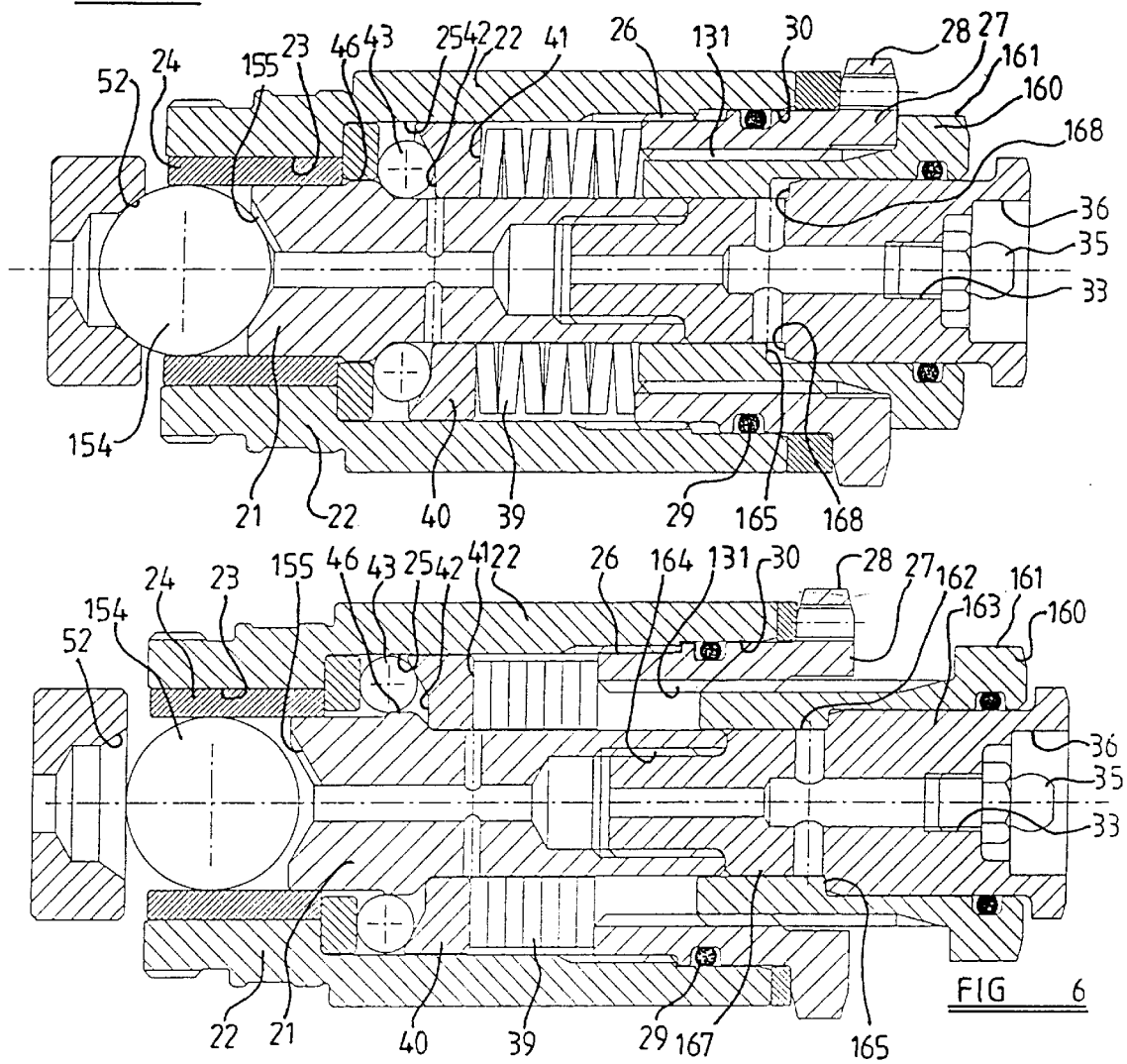
FIG 5
FIG 6
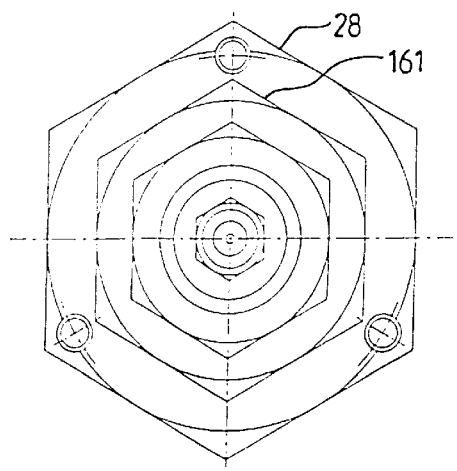
FIG 7

TORQUE LIMITING CLUTCH

BACKGROUND OF THE INVENTION

This invention relates to a torque limiting clutch, referred to hereinafter as being "of the kind specified" comprising first and second drive members mounted for rotation about an axis, a torque transmitting means, to transmit torque between said chive member up to a predetermined value, comprising a torque transmitting member carried by, and movable relative to, said first drive member between an operative position in which the torque transmitting member is in torque transmitting engagement with a torque transmitting abutment of said second drive member and an inoperative position in which the torque transmitting member is not in torque transmitting engagement with said abutment, connection means to act on said torque transmitting member with a biasing force applied to the connection means, by a main biasing means to urge said torque transmitting member into said operative position and the torque transmitting member being displaced against said biasing force, when the torque exceeds said pre-determined value, into said inoperative position and in which position the torque transmitting member is not acted upon by said biasing force.

A torque limiting clutch of the kind specified suffers from the disadvantage that re-engagement of the clutch after disengagement, in which the torque transmitting member is moved to said inoperative position, requires manual resetting of the clutch by pushing or hitting the torque transmitting member back into its operative position.

Such a clutch also suffers from the disadvantage that if it is desired to disengage the clutch manually this cannot be done conveniently without disturbing the magnitude of the biasing force since to permit the member to be moved from its operative position to its inoperative position requires release of the connection force from the biasing means.

SUMMARY OF THE INVENTION

An object of the present invention is to provide a torque limiting clutch of the kind specified whereby at least one of the above mentioned problems may be overcome or is reduced.

According to the present invention we provide a torque limiting clutch of the kind specified provided with at least one expedient, independent of said connection means, for movement of the torque transmitting member between said operative and inoperative positions.

The expedient may comprise a supplementary biasing means to act on said torque transmitting member to urge said member towards said operative position.

Alternatively, the expedient may comprise a retraction means operable to retract said torque transmitting member from said operative position.

The connection means may comprise a detent of said torque transmitting member and an element engageable with the detent to urge the torque transmitting member towards said operative position and disengagable from said detent when the applied torque exceeds said pre-determined value.

The element may be held in contact with the detent by a component having an element contacting face whereby to wedge the element towards said detent.

The element may be yieldably biased towards the detent

Preferably the component is yieldably biased towards the element which is corresponding yieldably biased towards the detent.

The yieldable bias may be provided by a resilient biasing means such as a spring.

The element may comprise a rolling element which may be a roller or a ball.

Preferably a plurality of such rolling elements are provided.

The component may comprise an annular member having a element contacting face to wedge the element towards the detent.

Preferably the rolling elements are yieldably held in contact with the detent by means of two generally annular members which are resiliently urged towards each other, the annular members having mutually inclined element contacting faces whereby to wedge the element towards the detent.

The detent may comprise an abutment surface facing away from the torque transmitting abutment of the second drive member.

The detent may be a shoulder between a smaller diameter portion and a larger diameter portion of the torque transmitting member with the element being in engagement with the larger diameter position when in said inoperative position.

The member may engage said torque transmitting abutment of the second drive member directly or indirectly, for example, via a further rolling element.

The abutment of the second drive member may comprise a torque transmitting recess.

When the torque transmitting member directly engages the abutment a nose part thereof the torque transmitting member may engage said recess.

When the torque transmitting member indirectly engages the abutment the member may be provided with a recess for torque transmitting engagement with said further rolling element which also engages said abutment of the second drive member.

Said main resilient biasing means may be engaged with a reaction member so as to bias the component parallel to the direction of movement of the torque transmitting member.

The reaction member may be axially adjustably engaged with a housing within which the said passage is provided.

The reaction member may be threadedly engaged with the housing to permit of adjustment of the resilient bias of said connecting means by adjusting the resilient biasing means axially thereof In the first expedient the torque transmitting member may be engaged with a supplementary resilient biasing means to bias the torque transmitting member into said operative position.

The torque transmitting member may be mounted for rectilinear movement in a passage of the first member and the supplementary biasing means may act between said member and an abutment portion of said passage.

The supplementary biasing means may be provided to act between said reaction member and a part of the torque transmitting member.

In said second expedient the reaction member may have a dis-engaging element axially movable there within and said disengaging element permitting movement of the torque transmitting member between its operative and inoperative position when the disengaging element is in a first axial position relative to the housing and being in engagement with the torque transmitting member when said disengaging element is moved axially relative to the housing away from said second drive member so as to move the torque transmitting abutment away from said operative position towards said inoperative position against the effect of said resilient biasing means.

The disengaging element may be threadedly engaged with said reaction member.

The reaction member may be of opposite handed threaded engagement with the housing to the threaded engagement of the disengaging member with the reaction member.

Two embodiments of the invention will now describe by way of example with reference to the accompanying drawings wherein:

BRIEF DESCRIPTION OF THE DRAWINGS

FIG. 5 is a view similar to that of FIG. 2 but showing an alternative embodiment of torque transmitting to a further enlarged scale and showing a minimum torque condition with the device engaged, FIG. 6 is a view similar to that of FIG. 5 showing the device in a maximum torque condition but with the device manually dis-engaged, and FIG. 7 is an end view of the devices of FIGS. 5 and 6.

DESCRIPTION OF THE PREFERRED EMBODIMENTS

Figure 1:
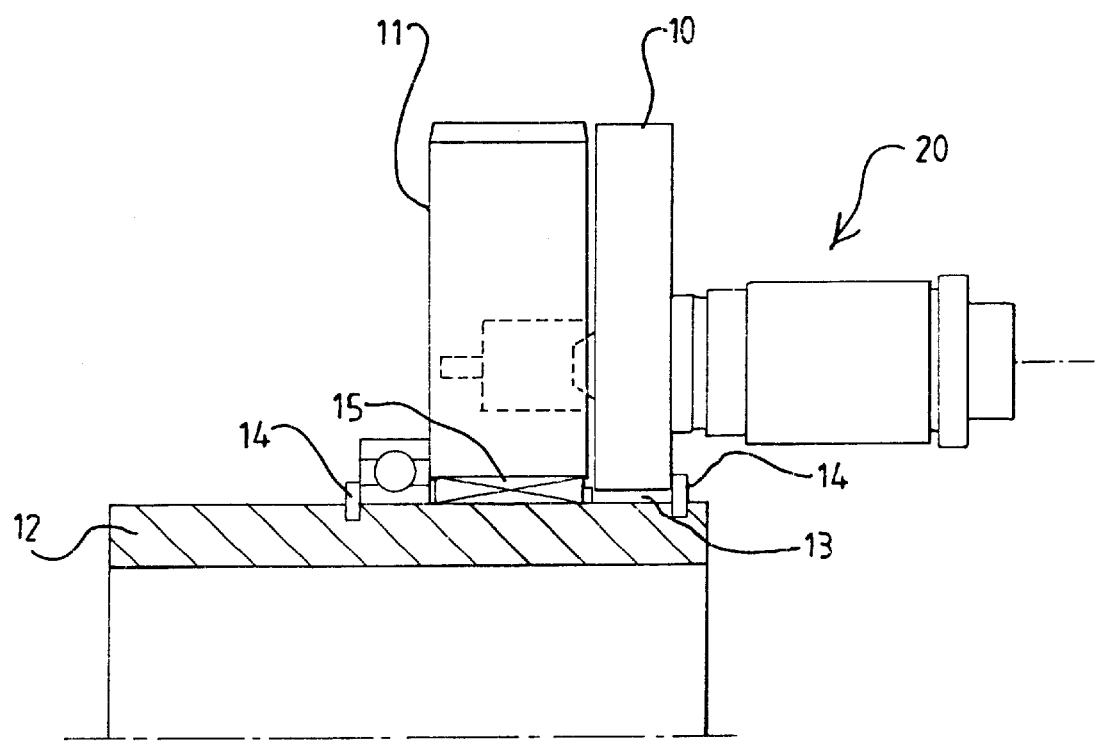
FIG. 1 is a longitudinal fractioned sectional view of a torque limiting coupling embodying the invention.

Referring now to FIG. 1 there is illustrated a torque transmitting clutch comprising first and second drive transmitting drive member 10, 11. In this embodiment the drive member 10 is fixed to a drive shaft 12 by any suitable means, such as a splined connection 13 and circlip 14 whilst the drive member 11 is mounted by a bearing means 15 and circlip 14 on the drive shaft 12 to make provision for the resultant axial thrust load.

Torque is transmitted between the drive elements 10, 11 by at least one torque transmitting means 20.

Figure 2:
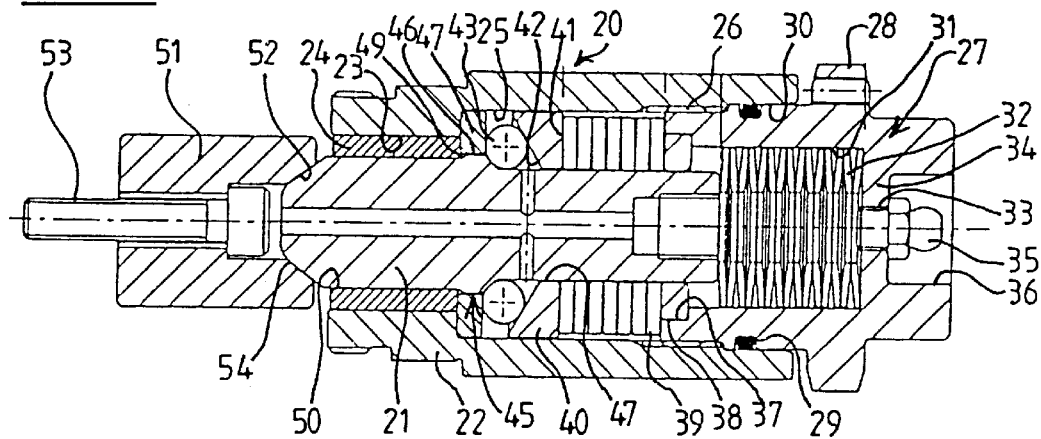
FIG. 2 is a cross sectional view of part of FIG. 1 to an enlarged scale, showing a torque transmitting device thereof and in an engaged condition at a maximum torque transmitting condition.
Figure 3:
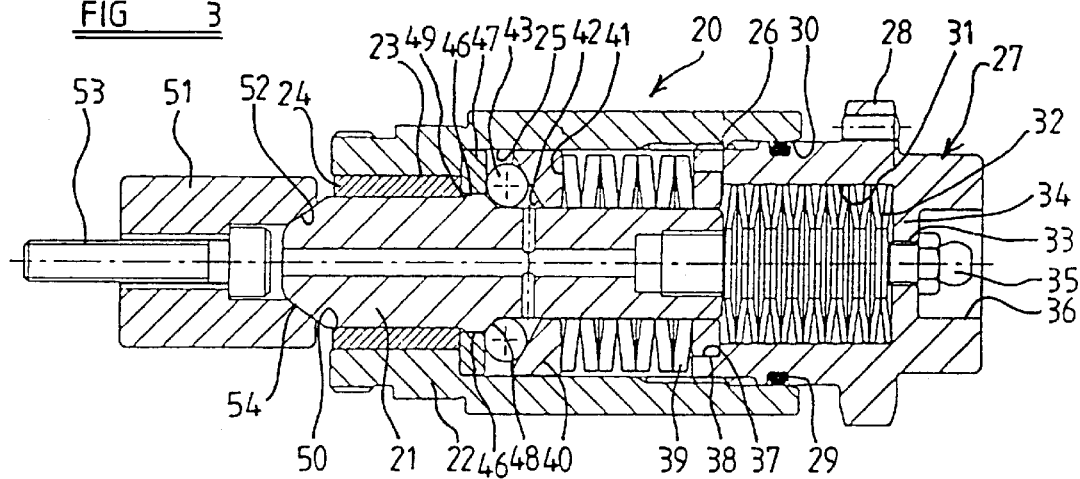
FIG. 3 is a view similar to that of FIG. 2 but showing the torque transmitting device in a minimum torque transmitting condition.
Figure 4:
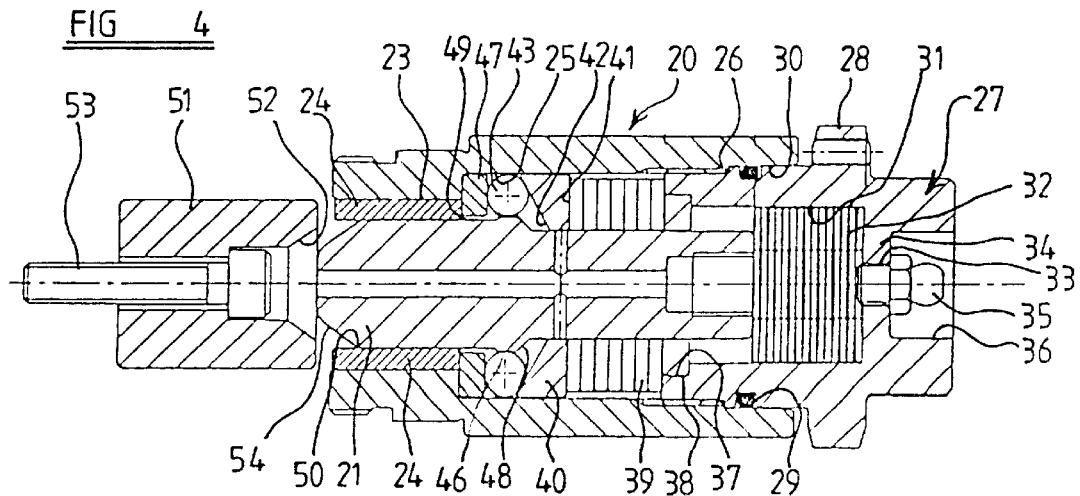
FIG. 4 is a view similar to that of FIG. 2 but showing the device in a disengaged condition.

Referring now to FIGS. 2 to 4, the or each torque transmitting means 20 comprises a first torque transmitting member 21 which is axially slidably mounted in a housing 22 fixed relative to the first drive member 10. The housing 22 has a counter-bored passage therein comprising a smaller diameter part 23 in which a bearing sleeve 24 is fixed for sliding engagement with the torque transmitting member 21. The counter-bored passage has a larger diameter part 25 having an internally threaded intermediate portion 26 in which a reaction member 27 is threadedly engaged. The reaction member 27 has a conventional external hexagonal formation 28 for engagement with a suitable tool, such as a spanner, and a O ring seal 29 is provided for sealing engagement with a cylindrical end part 30 of the counter-bored passage. The reaction member 27 is provided with an internal passage having a larger diameter part 31 to receive a stack of Belleville washers 32 to provide a supplementary biasing means as hereinafter to be described. The reaction member 27 is provided with a threaded opening 33 in a transverse wall 34 to threadedly receive a grease nipple 35 which is housed in a generally cylindrical recess 36.

The larger diameter part 31 of the passage has a counter-bored end part 37 in which a ring member 38 is received.

The ring member 38 engages one end of a stack of Belleville washers 39, which provide a main resilient biasing means and the other end of which engage a generally annular or ring component 40 having a surface 41 which is normal to the longitudinal axis of the counter-bored passage part 25 and a surface 42 which is inclined at an angle of, in the present example, 60° to the longitudinal axis of the part 25, for contact with a plurality of spherical balls. The balls provide a plurality of elements 43 which engage a detent 45 of the torque transmitting member 21. If desired, the element 43 may be of cylindrical roller configuration or, if desired it may be of non rotatable configuration.

In the present example the detent means 45 comprises a generally annular or ling like shoulder 45 provided between a larger diameter part 46 of the member 21 and a frusto-conical smaller diameter part 47 thereof. In the present example shoulder 45 is provided with a surface 48 which contacts the elements 43 at an angle of 45°. A washer 47 is disposed at the end of the part 25 of the passage to act as an abutment for the elements 43 on the opposite thereof to the component 40 and a shoulder 49 is provided between the larger diameter part 46 and a portion 50 of the torque transmitting member 21 which engages the bearing sleeve 24.

The second drive member 11 is provided with a further housing 51 having a generally frusto conical torque transmitting abutment or recess 52, the housing 51 being received in a recess in the second drive member 11 and being retained therein by a screw 53.

In use, when maximum torque transmission is required the reaction member 27 is rotated using the hexagonal formation 28 so as to screw it inwardly towards the second drive member 11 and so compress the washers 39 of the main biasing means to their maximum extent.

A nose part 54 of the torque transmitting member 21 is received within the torque transmitting recess 52 so as to be in torque transmitting relationship therewith so that torque is transmitted between the first and second drive members 10,11.

When the torque exceeds a pre-determined value the cooperating surfaces of the nose pair 54 and the recess 52 cause a reaction force to be applied to the torque transmitting member 21 so that it is biased rectilinearly to the right in FIG. 2 against the bias applied to the detent surface 48 by the ball elements 43 due to the wedging action of the surface 42 of the component 41, which is biased to the left in FIG. 2, by the reaction of the Belleville washers 39 against the washer 38.

As a result the ball elements 43 move radially outwardly so that the torque transmitting member 21 can move to the light in FIG. 2 into its inoperative position in which the ball elements 43 are engaged with the larger diameter part 46 of the torque transmitting member 21 as shown in FIG. 4. In this condition no biasing action is applied to the torque transmitting member 21 by the biasing force of the main biasing means 39 and so the torque transmitting member 21 remains in its inoperative position as shown in FIG. 4.

However due to the provision of the supplementary biasing means provided by the Belleville washers 32 the torque transmitting member 21 is continuously biased to the left in FIGS. 2 to 4 so that the torque transmitting member 21 is automatically returned to its operative position.

The supplementary biasing means provided by the washers 32 add to the bias provided by the main biasing means provided by the washers 39 when the torque transmitting member 21 is in its operative position or is moving towards its inoperative position. However, when the member 21 has attained its inoperative position, the supplementary biasing means 32 exert sufficient bias to overcome the friction which exists between the torque transmitting member 21 and the housing therefore as well as that imposed thereon by the spring loaded elements 43.

Accordingly, the nose part 54 of the torque transmitting abutment 21 will normally engage a part of the second drive member between the recesses 52 but will, if the drive members are mutually rotated, be pushed back into its operative position by the supplementary biasing means 32.

Obviously, the torque transmitting member 21 is continuously trying to re-engage due to the supplementary biasing means and hence this design is aimed at relatively low speed drives, for example, as are often found in the waste water industry. In most cases the drive may be switched off by a limit switch after overload, thereby preventing excessive wear on the plunger until the unit can be rotated to align the recess 52 with a nose part 54.

FIG. 3 shows an engaged condition in which the reaction member 27 is screwed outwardly compared with the position shown in FIG. 2 to illustrate a lower torque transmittal condition.

Referring now to FIGS. 5 to 7, the torque transmitting means 20 are as described in connection with FIGS. 2 to 4 except for the features of difference described below and hence the same reference numerals have been used therein to refer to corresponding parts as were used in FIGS. 1 to 4.

The features of difference will now be described. The nose part of the torque transmitting member 21 is provided with a further rolling element comprising a spherical ball 154 received in a frusto-conical recess 155 of the torque transmitting member 21.

Instead of the supplementary biasing means 32 of the previous embodiment the reaction member 27 is provided with a through bore 131 which is internally threaded for threaded engagement with a disengaging element 160. The disengaging element 160 has an external hexagonal formation 161 so that it may be rotated relative to the reaction member 27. Preferably, as in this example, the thread 131 is of opposite hand to the thread 26 so as to avoid unscrewing the reaction member 27 from housing 22.

The disengaging element 160 is provided with a counterbored central passage 162 in which is received an extension part 163 which is threadedly engaged, as shown as 164, with the torque transmitting member 21 so as to move axially therewith. The extension part 163 is provided with an annular shoulder 165 disposed between larger and smaller diameter cylindrical parts 166, 167 respectively of the extension part 163.

An O ring seal is provided between the extension part 163 and the disengaging element 160.

In use, the reaction member 27 can be screwed inwardly, as shown in FIG. 6, into the housing 22 to compress the washers 39 to provide maximum torque transmission or may be screwed outwardly, as shown in FIG. 5 to provide a minimum torque transmission position by stressing the Belleville washers 39 more lightly. The engaged position is shown in FIG. 5 which illustrates a minimum torque transmission condition. When it is desired manually to disengage the clutch, the disengaging element 160 is rotated relative to the housing 22 by a suitable tool engaged with the formation 161, so as to screw it outwardly to the position shown in FIG. 6. The main biasing means 39 remains unaffected by this and, in the example illustrated in FIG. 6 the springs 39 remain in their maximum compressed condition, this depending solely upon the position of the reaction member 27 which is left unadjusted.

By moving the disengaging element to the right in FIG. 6 the torque transmitting member 21 is likewise moved to the right thereby forcing the elements 43 radially outwardly from the position shown in FIG. 5 to the position shown in FIG. 6 thereby moving the component 40 likewise from the position shown in FIG. 5 to the position shown in FIG. 6 against the bias of the main resilient biasing means 39. Re-engagement is carried out in reverse by aligning the members 10,11 by aligning the recess or seat 52 and ball 154 and then pushing or impacting the extension part 163 back into the drive position.

When the retraction means provided by the disengagement element 160 is in its inoperative position i.e. in its left most position shown in FIG. 5 a gap is provided between the shoulder 165 of the disengaging element 160 and a shoulder 168 provided between the larger and smaller diameter parts of the extension 163 so that normal engagement of the torque transmitting members 1 with the seat 52 can take place and disengagement can also take place in the normal way.

It will be appreciated that in each embodiment the automatic resetting using the supplementary biasing means 32 and the manual ability to disengage the torque limiting clutch by rotating the disengaging element 160 are provided independently of the main connection means provided by the washers 39 component 40 elements 43 and detent 48.

If desired, alternatively, the main and/or supplementary biasing means may be of any convenient kind such as a coil compression spring or a fluid operated means, or an elastomeric means.

The features disclosed in the foregoing description, or the following claims, or the accompanying drawings, expressed in their specific forms or in terms of a means for performing the disclosed function, or a method or process for attaining the disclosed result, as appropriate, may, separately or in any combination of such features, be utilised for realising the invention in diverse forms thereof

I claim:

1. A torque limiting clutch comprising first and second drive members mounted for rotation about an axis, a torque transmitting means, to transmit torque between said drive members up to a predetermined value, said torque transmitting means comprising a torque transmitting member carried by, and movable relative to, said first drive member between an operative position in which the torque transmitting member is in torque transmitting engagement with a torque transmitting abutment of said second drive member and an inoperative position in which the torque transmitting member is not in torque transmitting engagement with said abutment, connection means to act on said torque transmitting member with a biasing force applied to the connection means, by a main biasing means, to urge said torque transmitting member into said operative position and said torque transmitting member being displaced against said biasing force, when the torque exceeds said predetermined value, into said inoperative position and in which position the torque transmitting member is not acted upon by said biasing force and at least one expedient, independent of said connection means, for movement of the torque transmitting member between said operative and inoperative positions.

2. A torque limiting clutch according to claim 1 wherein the expedient comprises a supplementary biasing means to act on said torque transmitting member to urge said member towards said operative position.

3. A torque limiting clutch according to claim 2 wherein the torque transmitting member is engaged with a supplementary resilient biasing means to bias the torque transmitting member into said operative position.

4. A torque limiting clutch according to claim 3 wherein the transmitting member is mounted for rectilinear movement in a passage of the first member and the supplementary biasing means is provided to act between said member and an abutment portion of said passage.

5. A torque limiting clutch according to claim 3 wherein where said main biasing means is engaged with a reaction member so as to bias the component parallel to the direction of movement of the torque transmitting member and wherein the supplementary biasing means is provided to act between said reaction member and a part of the torque transmitting member.

6. A torque limiting clutch according to claim 1 wherein the expedient comprises a retraction means operable to retract said torque transmitting member from said operative position.

7. A torque limiting clutch according to claim 6 wherein the connection means comprises a detent of said torque transmitting member and an element engageable with the detent to urge the torque transmitting member towards said operation position and disengageable from said detent when the applied torque exceeds said pre-determined value, the element being held in contact with the detent by a component having an element contacting face whereby to urge the element towards said detent, said main biasing means being engaged with a reaction member so as to bias the component parallel to the direction of movement of the torque transmitting member, the reaction member being axially adjustably engaged in a passage provided in a housing which is fixed to urge the first drive member and wherein the reaction member has a disengaging element axially movable there within and said disengaging element permitting movement of the torque transmitting member between its operative and inoperative position when the disengaging element is in a first axial position relative to the housing and being in engagement with the torque transmitting member when said disengaging element is moved axially relative to the housing away from said second drive member so as to move the torque transmitting abutment away from said operative position towards said inoperative position against the effect of said main biasing means.

8. A torque limiting clutch according to claim 7 wherein said main biasing means is engaged with the reaction member so as to bias the component parallel to the direction fo movement of the torque transmitting member and wherein the disengaging element is threadedly engaged with said reaction member.

9. A torque limiting clutch according to claim 8 wherein the reaction member is of opposite handed threaded engagement with the housing to the threaded engagement of the disengaging element with the reaction member.

10. A torque limiting clutch according to claim 1 wherein the connection means comprises a detent of said torque transmitting member and an element engageable with the detent to urge the torque transmitting member towards said operative position and disengagable from said detent when the applied torque exceeds said pre-determined value.

11. A torque limiting clutch according to claim 10 where the element is held in contact with the detent by a component having an element contacting face whereby to urge the element towards said detent.

12. A torque limiting clutch according to claim 11 wherein the component comprises an annular member having said element contacting face to urge the element towards the detent.

13. A torque limiting clutch according to claim 11 where said main biasing means is engaged with a reaction member so as to bias the component parallel to the direction of movement of the torque transmitting member.

14. A torque limiting clutch according to claim 13 wherein the reaction member is axially adjustably engaged in a passage provided in a housing which is fixed relative to the first drive member.

15. A torque limiting clutch according to claim 14 wherein the reaction member is threadedly engaged with the housing to permit of adjustment of the biasing force by adjusting the main biasing means axially thereof.

16. A torque limiting clutch according to claim 10 wherein the element is yieldably biased towards the detent.

17. A torque limiting clutch according to claim 10 wherein the component is yieldably biased towards the element which is yieldably biased towards the detent.

18. A torque limiting clutch according to claim 10 wherein the element comprises a rolling element and wherein a plurality of such elements are provided.

19. A torque limiting clutch according to claim 18 wherein the rolling elements are yieldably held in contact with the detent by means of two generally annular members which are resiliently urged towards each other, the annular members having mutually inclined element contacting faces whereby to wedge the element towards the detent.

20. A torque limiting clutch according to claim 10 wherein the detent comprises an abutment surface facing away from the torque transmitting abutment of the second drive member.

21. A torque limiting clutch according to claim 10 wherein the detent is a frusto-conical shoulder between a smaller diameter portion and a larger diameter portion of the torque transmitting member with the element being in engagement with the larger diameter portion when in said inoperative position.

22. A torque limiting clutch according to claim 1 wherein the torque transmitting member engages said torque transmitting abutment of the second drive member directly.

23. A torque limiting clutch according to claim 1 wherein the torque transmitting member engages said torque transmitting abutment of the second drive member indirectly via a rolling element.

24. A torque limiting clutch according to claim 1 wherein the abutment of the second drive member comprises a torque transmitting recess.

25. A torque limiting clutch according to claim 24 when the torque transmitting member directly engages the abutment, a nose part thereof the torque transmitting member engages said recess.

26. A torque limiting clutch according to claim 24 wherein the torque transmitting member engages said torque transmitting abutment of the second drive member indirectly via a rolling element and when the torque transmitting member indirectly engages the abutment the member is provided with a recess for torque transmitting engagement with said rolling element which also engages said abutment of the second drive member.

* * * * *

UNITED STATES PATENT AND TRADEMARK OFFICE
CERTIFICATE OF CORRECTION

PATENT NO.    : 6,059,087
DATED         : May 9, 2000
INVENTOR(S)   : Stephen John Parry It is certified that error appears in the above-identified patent and that said Letters Patent is hereby corrected as shown below:

<u>Column 7, claim 8,</u>
Line 53, change "fo" to -- of --

Signed and Sealed this

Thirty-first Day of July, 2001

*Attest:*

*Attesting Officer*

NICHOLAS P. GODICI
*Acting Director of the United States Patent and Trademark Office*